(12) United States Patent
Fujii (10) Patent No.: US 9,235,199 B2
(45) Date of Patent: Jan. 12, 2016

(54) WARM-UP CONTROL DEVICE FOR MACHINE TOOL

(71) Applicant: FANUC CORPORATION, Yamanashi (JP)

(72) Inventor: Takaaki Fujii, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 638 days.

(21) Appl. No.: 13/688,580

(22) Filed: Nov. 29, 2012

(65) Prior Publication Data

US 2013/0211598 A1 Aug. 15, 2013

(30) Foreign Application Priority Data

Feb. 13, 2012 (JP) ................................. 2012-028676

(51) Int. Cl.
G05B 11/01 (2006.01)
G05B 19/404 (2006.01)

(52) U.S. Cl.
CPC .............. *G05B 11/01* (2013.01); *G05B 19/404* (2013.01); *G05B 2219/49219* (2013.01)

(58) Field of Classification Search
CPC ................. G05B 11/01; G05B 19/404; G05B 2219/49219
See application file for complete search history.

(56) References Cited

U.S. PATENT DOCUMENTS

| 4,533,858 | A | * | 8/1985 | Tlaker | B23Q 15/18 318/471 |
| 4,928,019 | A | * | 5/1990 | Tomikawa | B23Q 15/18 250/559.3 |
| 6,023,402 | A | * | 2/2000 | Kaminski | G06F 1/206 307/116 |
| 7,567,401 | B2 | * | 7/2009 | Lee | G11B 19/20 318/400.12 |
| 2003/0163286 | A1 | * | 8/2003 | Yasugi | G05B 19/4065 702/185 |
| 2005/0209712 | A1 | * | 9/2005 | Sagasaki | G05B 19/4093 700/28 |
| 2006/0089742 | A1 | * | 4/2006 | Jalluri | G05B 19/4065 700/159 |
| 2006/0089744 | A1 | * | 4/2006 | Jalluri | G05B 19/4065 700/174 |
| 2006/0095155 | A1 | * | 5/2006 | Shibui | G05B 19/40938 700/159 |

FOREIGN PATENT DOCUMENTS

| DE | 102004044838 A1 | 3/2006 |
| DE | 102009021122 A1 | 11/2010 |

(Continued)

OTHER PUBLICATIONS

Office Action dated Aug. 21, 2014, corresponding to German patent application No. 102013101346.5.
Office Action with English translation dated Apr. 9, 2013 (4 pages).

*Primary Examiner* — Ramesh Patel
(74) *Attorney, Agent, or Firm* — Hauptman Ham, LLP (57) ABSTRACT

Prior to machining a workpiece, a warm-up control device for a machine tool is activated to perform a warm-up in which a main shaft rotary drive part and axes drive parts are driven. The amount of displacement of heat that is generated upon starting of the warm-up and changes with time is calculated every predetermined time period. Whether to end the warm-up is determined based on the thermal displacement amount. Whether to restart the warm-up after the end of the warm-up is determined based on the thermal displacement amount. When it is determined to restart the warm-up, the warm-up is restarted.

9 Claims, 11 Drawing Sheets

(56) References Cited

U.S. PATENT DOCUMENTS

| | | | |
|---|---|---|---|
| 2007/0213867 A1* | 9/2007 | Prust | B23Q 11/0007 700/193 |
| 2008/0083585 A1* | 4/2008 | Yanohara | F16C 33/6625 184/6.1 |
| 2009/0058343 A1* | 3/2009 | Bund | G05B 19/4142 318/570 |
| 2010/0145499 A1* | 6/2010 | Sato | B23Q 11/0003 700/193 |
| 2012/0266828 A1* | 10/2012 | Araki | F01P 7/164 123/41.08 |

FOREIGN PATENT DOCUMENTS

| | | |
|---|---|---|
| JP | 2002-18677 A | 1/2002 |
| JP | 2009-113138 A | 5/2009 |
| JP | 2009125905 A | 6/2009 |

* cited by examiner

WARM-UP CONTROL DEVICE FOR MACHINE TOOL

RELATED APPLICATIONS

The present application claims priority from, Japanese Application No. 2012-028676, filed Feb. 13, 2012, the disclosure of which is hereby incorporated by reference herein in its entirety.

BACKGROUND OF THE INVENTION

1. Field of the Invention

The present invention relates to a warm-up control device for a machine tool.

2. Description of the Related Art

The main shaft attached to a machine tool is rotated by a rotary drive means such as a motor. Therefore, it is known that a machining tool attached to a tip of the main shaft is displaced by the heat generated from the rotary drive means itself or heat generated from a main shaft bearing, causing errors. Moreover, when thermal displacement occurs in a base of the machine tool due to the heat generated by drive means such as a motor used for axis feeding for relatively displacing the positions of a workpiece and the tool, changes in temperature in the environment where the machine tool is installed, and the heat generated in driving of the abovementioned main shaft, the relative position between the workpiece and the tool becomes shifted, causing machining errors.

A method called "warm-up" has been known as a way to solve these problems. A warm-up is an operating method in which, especially due to the impact of thermal displacement of the main shaft caused by its rotation, the main shaft is idled in order to maintain machining accuracy, and then a workpiece is machined after thermal displacement of the main shaft becomes stable. Although the idling for achieving stable machining accuracy is performed until the thermal displacement in the machine tool is stabilized, how long the idling needs to be performed is determined based on the experiences or intuition of a skilled operator. Thus, whether the thermal displacement is definitely stabilized or not is uncertain. Moreover, it might take an unnecessarily long time for such warm-up.

Japanese Patent Application Laid-Open No. 2009-113138, for example, discloses a method that continuously measures the position of the tip of a tool by using a measuring device such as a laser interferometer, calculates the thermal displacement amount of the position of the tip of the tool from a result of the measurement, and ends the warm-up based on the calculated thermal displacement amount.

However, Japanese Patent Application Laid-Open No. 2009-113138 only describes that the way of ending the warm-up is to simply end the warm-up or to automatically start machining. When the warm-up is simply ended, the machining starting point on the tool at which the machining is started needs to be reset manually. In a case where an operator gets caught up in another work and leaves the machine tool after the end of the warm-up, the warm-up needs to be carried out again, which is not necessarily efficient. It is not particularly problematic to start machining automatically, but automatically resetting the machining starting point requires a measuring device that is capable of controlling the tool by using a numerical controller. However, not all machine tools are equipped with such measuring devices.

SUMMARY OF THE INVENTION

The present invention was contrived in view of the problems of the conventional technologies described above, and an object of the present invention is to provide a warm-up control device for a machine tool, which is capable of controlling an automatic restart of a warm-up after a warm-up is ended and even when an operator simply ends the warm-up and then mistakenly leaves the machine tool, and capable of preventing an unnecessary re-warm-up of the machine tool without having concern about thermal displacement that is caused when the machine tool cools down.

A warm-up control device for a machine tool according to the present invention performs, before machining a workpiece, a warm-up by driving a main shaft rotary drive part for rotating a main shaft of the machine tool and axes drive parts for relatively driving the workpiece and a tool. The warm-up control device for a machine tool has: a thermal displacement amount calculation part that obtains a thermal displacement amount that results from heat generated or released upon starting or ending the warm-up of the machine tool and changes with time; a thermal displacement amount storage unit that stores the thermal displacement amount that is calculated every predetermined time period by the thermal displacement amount calculation part; a warm-up end determination part that determines whether to end the warm-up based on the thermal displacement amount; a warm-up ending part that ends the warm-up when the warm-up end determination part determines to end the warm-up; a warm-up restart determination part that determines whether to restart the warm-up after the end of the warm-up, based on the thermal displacement amount; and a warm-up restarting part that restarts the warm-up when the warm-up restart determination part determines to restart the warm-up.

In a case where an operator is caught up in another work and mistakenly leaves the machine tool after the end of the warm-up, the present invention can eliminate the waiting time generated when restarting the warm-up, by performing control for automatically restarting the warm-up. Furthermore, because warm-up end determination means, warm-up restart determination means, and warm-up ending means can be selected in accordance with how the machine tool is used, the present invention can accommodate various environments where users use machine tools.

The thermal displacement amount storage unit may store a time at which the thermal displacement amount is calculated every predetermined time period by the thermal displacement amount calculation part, and the warm-up restart determination part may call up, from the thermal displacement amount storage unit, the thermal displacement amount that is calculated every predetermined time period back to a time traced back by a previously set time period, calculate a difference between a maximum value and minimum value out of the called thermal displacement amounts, and restart the warm-up when the difference is greater than a previously set permissible value.

According to this embodiment, in order to determine to restart the warm-up, the greatest difference between the thermal displacement amounts that are calculated every predetermined time period within a certain time range is used. Therefore, it can be accurately determined whether the stability of the thermal displacement used as the basis for determining to restart the warm-up is damaged or not. In addition, the present invention can accommodate various environments where users use machine tools, by changing a time period (T) and the permissible value (PmA) defined in "setting of operating conditions" used for the determination.

The warm-up restart determination part may restart the warm-up when a current thermal displacement amount calculated by the thermal displacement amount calculation part is smaller than a previously set permissible thermal displacement amount.

According to this embodiment, in order to determine whether to restart the warm-up, a permissible thermal displacement amount (PmB), which is a fixed value that can be set freely, is used so that the value of thermal displacement determined by the operator's experiences or intuition can be reflected in controlling the restart of the warm-up.

The thermal displacement amount storage unit may store a time at which the thermal displacement amount is calculated every predetermined time period by the thermal displacement amount calculation part, and the warm-up end determination part may call up, from the thermal displacement amount storage unit, the thermal displacement amount that is calculated every predetermined time period back to a time traced back by a previously set time period, calculate a difference between a maximum value and minimum value out of the called thermal displacement amounts, and end the warm-up when the difference is smaller than a previously set permissible value.

According to this embodiment, in order to perform "determination on whether to end the warm-up," the greatest difference between the thermal displacement amounts that are calculated every predetermined time period within a certain time range is used. Therefore, it can be accurately determined whether the stability of the thermal displacement used as the basis for determining to restart the warm-up is damaged or not. In addition, the present invention can accommodate various environments where users use machine tools, by changing the time period (T) and permissible value (PmA) defined in "setting of operating conditions" used for the determination.

The warm-up end determination part may end the warm-up when a current thermal displacement amount calculated by the thermal displacement amount calculation part is greater than a previously set permissible thermal displacement amount.

According to this embodiment, in order to perform "determination on whether to end the warm-up," the permissible thermal displacement amount (PmB), which is a fixed value that can be set freely, is used so that the value of thermal displacement determined by the operator's experiences or intuition can be reflected in controlling the restart of the warm-up.

The warm-up control device for a machine tool can further have a warm-up end reporting part that sends a notification of the end of the warm-up when the warm-up is ended by the warm-up ending part.

According to this embodiment, an operation work can be performed without generating an unnecessary waiting time period, by accurately notifying an operator of the end of the warm-up. In addition, the possibility that the operator might leave the machine tool after the end of the warm-up can be reduced.

The present invention can provide a warm-up control device for a machine tool, which is capable of controlling an automatic restart of a warm-up after a warm-up is ended and even when an operator simply ends the warm-up and then mistakenly leaves the machine tool, and capable of preventing an unnecessary re-warm-up of the machine tool without having concern about thermal displacement that is caused when the machine tool cools down.

BRIEF DESCRIPTION OF THE DRAWINGS

The above-described and other objects and characteristics of the present invention are made apparent in the descriptions of the embodiments below with reference to the attached diagrams.

FIG. 7 is a flowchart relating to calculation of a thermal displacement amount that is performed when a warm-up mode is ON.

DESCRIPTION OF THE PREFERRED EMBODIMENTS

A vertical drill press, an example of a machine tool, is now described with reference to FIG. 1.

Reference numeral 62 represents a spindle motor, 52 a Z-axis servomotor functioning as a vertical feed shaft, 10 a numerical controller (CNC) for controlling the vertical drill press, T a table, 64 a main shaft, and 65 a tool attached to the main shaft 64. The table T is moved in X-axis and Y-axis directions, which are perpendicular to each other in a direction perpendicular to a Z-axis, by X-axis and Y-axis servomotors, not shown. The configuration of this vertical drill press 1 is the same as those of conventional drill presses; thus, the detailed explanation thereof is omitted. In this vertical drill press, a warm-up is performed by idling the spindle motor 62. This can stabilize the machining accuracy of the vertical drill press.

Heat that is generated from the main shaft and the amount of thermal displacement that is caused by the rotation of the spindle motor 62 can be calculated through the warm-up. For example, the thermal displacement amount in the warm-up can be calculated by previously obtaining a calculation formula for obtaining the thermal displacement amount from a rotating speed of the main shaft and a load of a main shaft motor. Note that the method disclosed in, for example, Japanese Patent Application Laid-Open No. 2002-18677 is known as a method for calculating a thermal displacement amount of a machine tool. A method for calculating the thermal displacement amount in the present invention is not limited to this known method.

Figure 1:
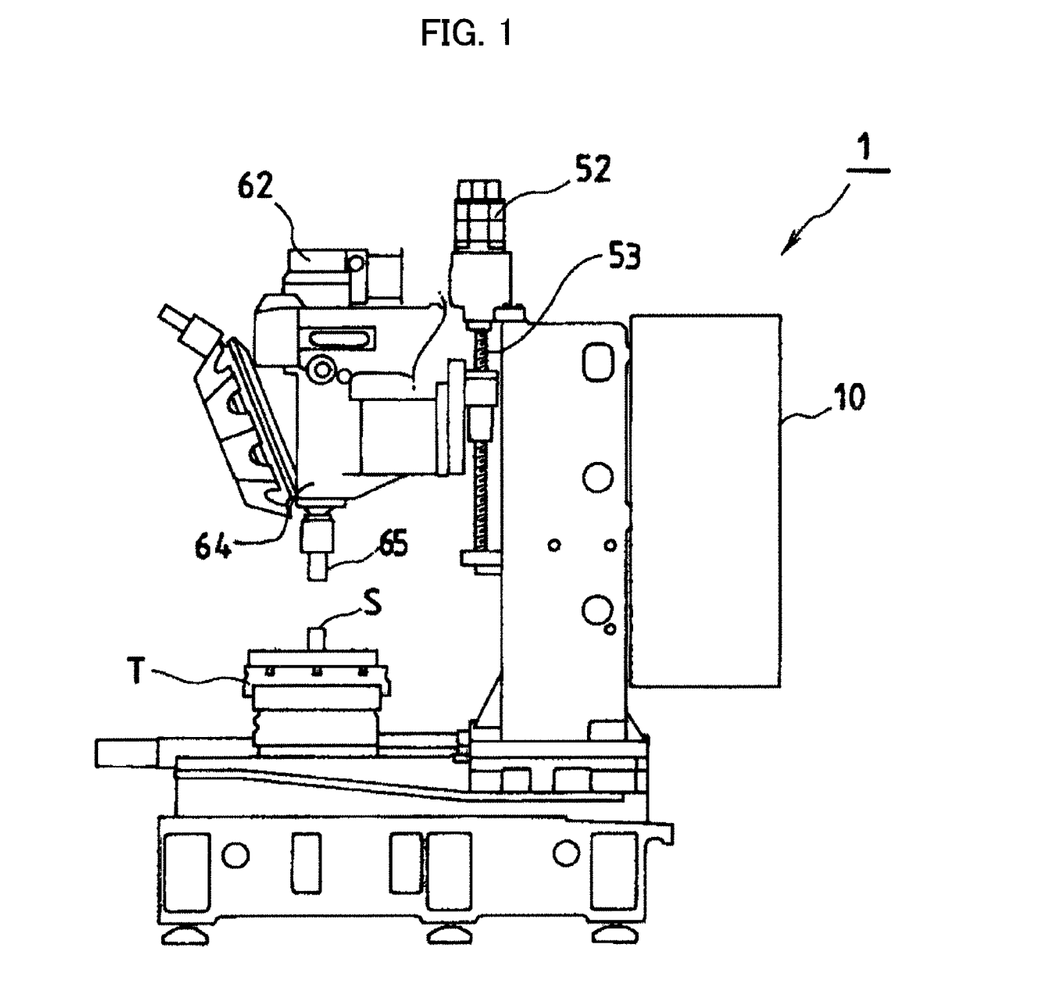
FIG. 1 is a diagram showing an example of a machine tool.
Figure 2:
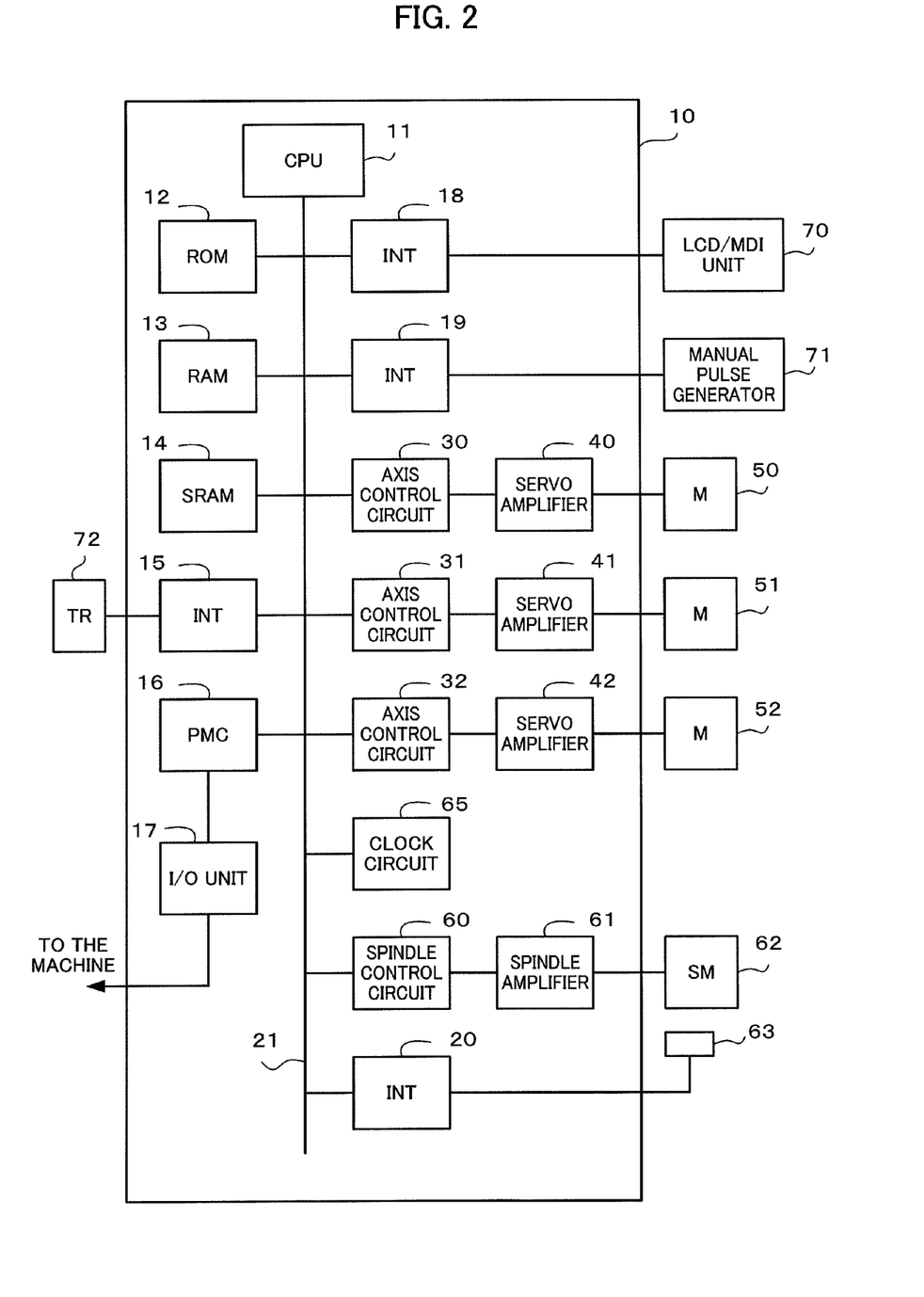
FIG. 2 is a block diagram illustrating substantial parts of a numerical controller for controlling the machine tool shown in FIG. 1.

Substantial parts of the numerical controller 10 shown in FIG. 1 are described using a functional block diagram of FIG. 2.

A processor (CPU) 11 of the numerical controller 10 controls the entire numerical controller 10. This processor 11 reads a system program stored in a ROM 12, via a bus 21, to control the entire numerical controller 10 in accordance with the system program. Temporary computational data or display data, as well as various data that are input by an operator via an LCD/MDI unit 70, are stored in a RAM 13.

An SRAM 14 is configured as a nonvolatile memory that is backed up by a battery (not shown) and keeps storing information even when the power of the numerical controller 10 is OFF. The SRAM 14 stores a program for measuring an initial position, a program for correcting thermal displacement of the machine tool, a machining program that is read through an interface 15, which is described hereinafter, and a machining program that is input via the LCD/MDI unit 70. Various system programs for implementing a process of an edit mode required for creating and editing the machining programs and a process for automatically operating the machine tool, are stored in the ROM 12 in advance.

The interface 15 is an interface for connecting an external device to the numerical controller 10. An external device 72 such as an external storage unit is connected to the numerical controller 10. A machining program, a thermal displacement measuring program and the like are read from the external device 72. A programmable machine controller (PMC) 16 controls auxiliary devices and the like of the machine tool based on sequence programs embedded in the numerical controller 10. In other words, the sequence programs convert signals required by the auxiliary devices, in accordance with an M function, S function, and T function that are instructed by the machining program, and then outputs the resultant signals from an I/O unit 17 to the auxiliary devices. The auxiliary devices such as various actuators are activated by the output signals. The PMC 16 also receives signals of various switches of an operation panel disposed in a main body of the machine tool, performs necessary processes on these signals, and delivers the signals to the processor 11.

Current positions of respective axes of the machine tool, alarms, parameters, and image signals such as image data are transmitted to the LCD/MDI unit 70 and displayed on a display of the LCD/MDI unit 70. The LCD/MDI unit 70 is a manual data input device having the display, a keyboard, and the like. An interface 18 receives data from the keyboard of the LCD/MDI unit 70 and delivers the data to the processor 11.

An interface 19 is connected to a manual pulse generator 71. The manual pulse generator 71 is mounted on the operation panel of the machine tool and used for precisely determining the position of a movable part of the machine tool under axis control by a distribution pulse based on an manual operation.

X-axis and Y-axis control circuits 30 and 31 for moving the table T of the machine tool and a Z-axis control circuit 32 receive, from the processor 11, commands for moving the axes (X, Y, and Z-axes), and output these commands to respective servo-amplifiers 40 to 42. In response to these commands, the servo amplifiers 40 to 42 drive servomotors 50 to 52 of the axes (X, Y, and Z-axes) of the machine tool. The servomotors 50 to 52 for the respective axes have position detection encoders embedded therein. Positional signals obtained from the encoders are fed back in the form of pulse strings to the numerical controller 10.

A spindle control circuit 60 receives a main shaft rotation command to be sent to the machine tool, and outputs a spindle speed signal to a spindle amplifier 61. In response to the spindle speed signal, the spindle amplifier 61 rotates the spindle motor 62 of the machine tool at an instructed rotating speed, to drive the tool.

A position detector 63 is coupled to the spindle motor 62 by a gear, a belt, or the like. The position detector 63 outputs a feedback pulse in synchronization with the rotation of the main shaft. The feedback pulse is read by the processor 11 via an interface 20. A clock circuit 65 is a timer that is adjusted to synchronize with a current time.

Control of a warm-up executed by the numerical controller 10 is described hereinafter. The numerical controller 10 functions as a warm-up control device according to the present invention.

Figure 3A:
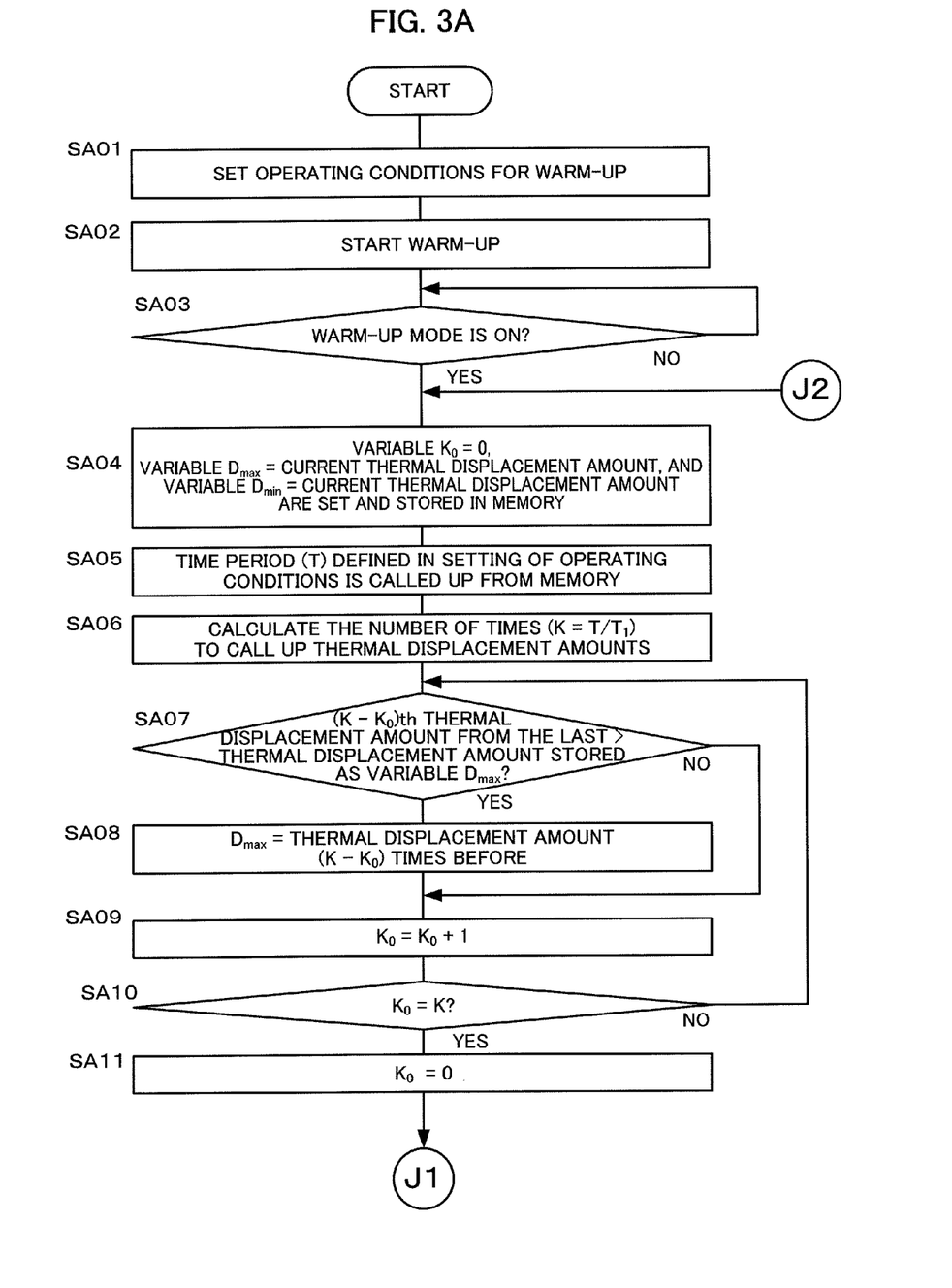
FIGS. 3A and 3B are flowcharts of Embodiment 1 of a process from the start of a warm-up to the end of the warm-up, which is executed by the numerical controller shown in FIG. 2.
Figure 3B:
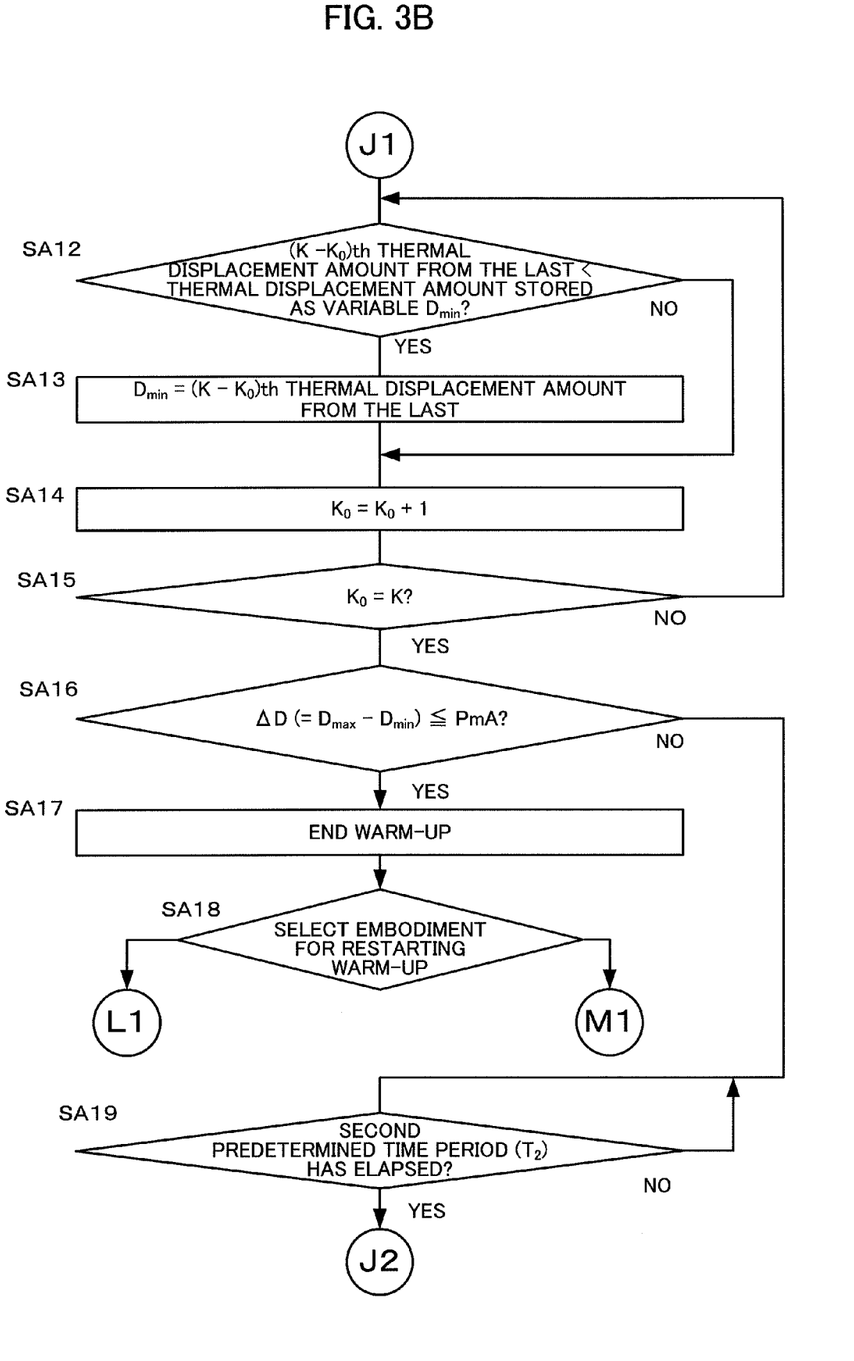
Figure 4:
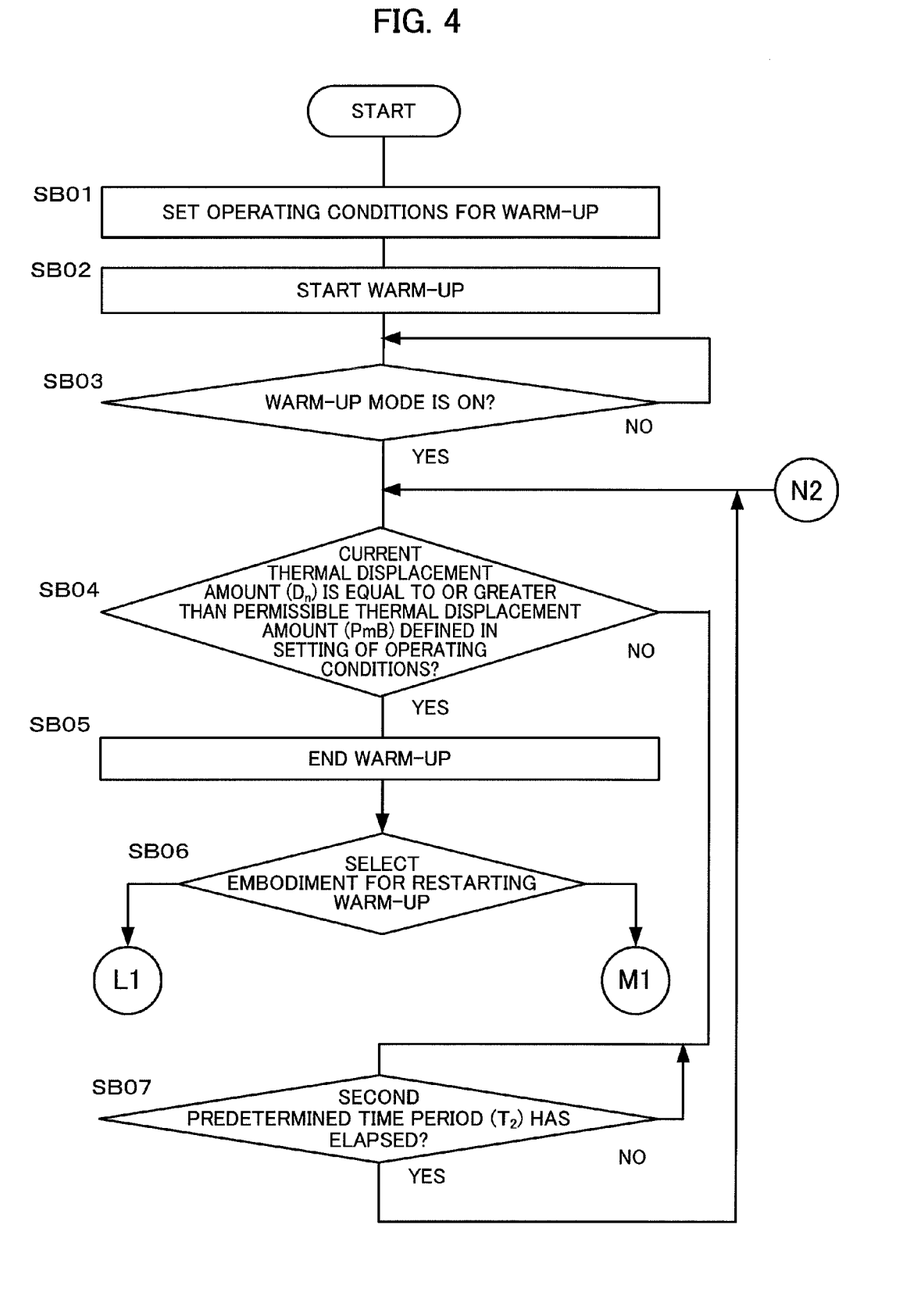
FIG. 4 is a flowchart of Embodiment 2 of the process from the start of the warm-up to the end of the warm-up.

<1> From the Start of a Warm-Up to the End of the Warm-Up (FIGS. 3A, 3B, and 4)

Embodiment 1 of a process from the start of a warm-up to the end of the warm-up (FIGS. 3A and 3B) and Embodiment 2 of the process (FIG. 4) are described hereinafter in detail.

Figure 8:
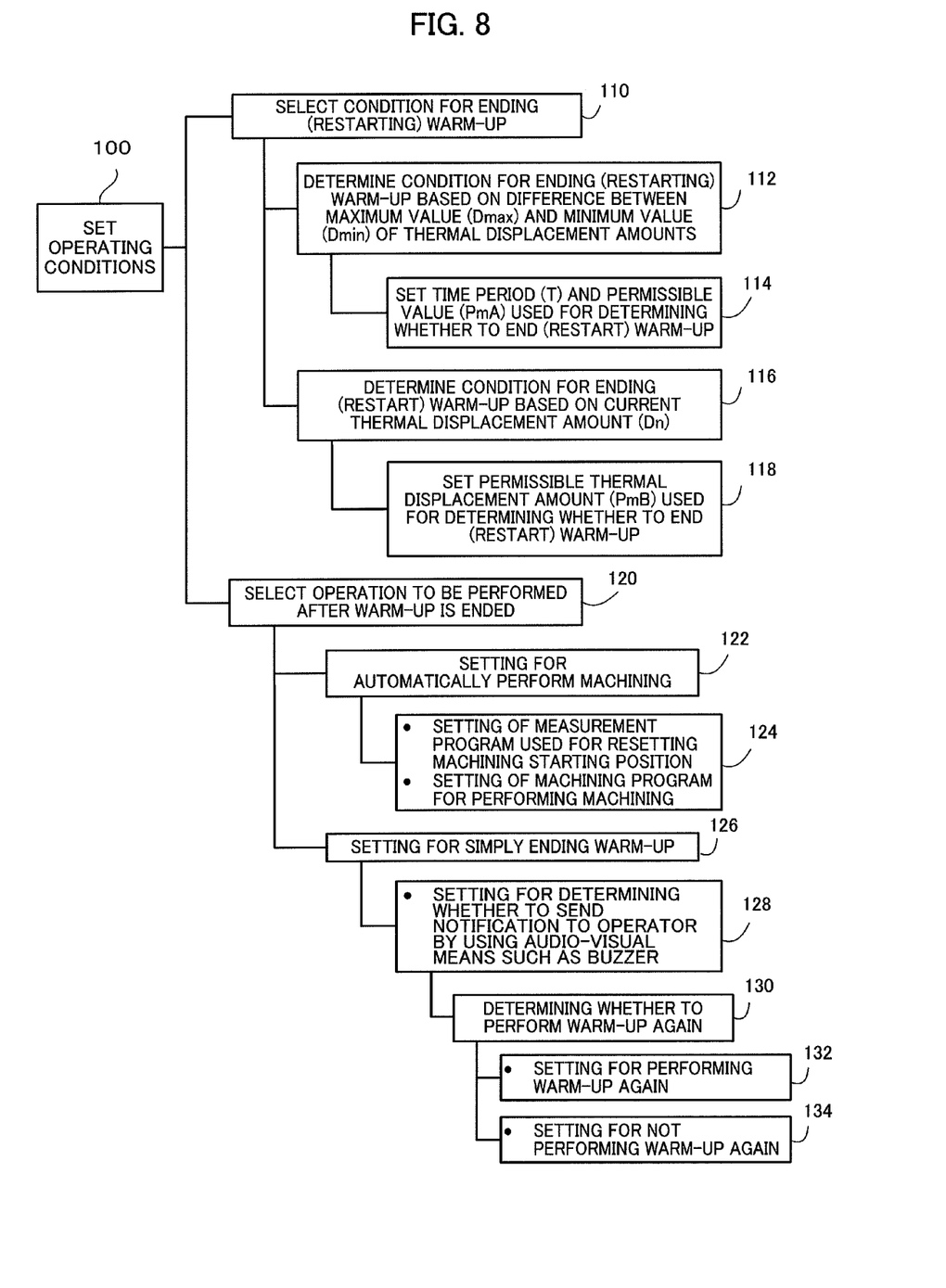
FIG. 8 is a diagram illustrating the items for "setting of operating conditions."

Information that is required to control the warm-up is subjected to "setting of operating conditions." As shown in FIG. 8, "setting of operating conditions" are performed as follows:

(1) Select a condition for ending (restarting) the warm-up (110)

(1-1) Determining a condition for ending (restarting) the warm-up, based on the difference between a maximum value ($D_{max}$) and minimum value ($D_{min}$) of thermal displacement amounts (112), Setting a time period (T) and permissible value (PmA) that are used for determining whether to end (restart) the warm-up (114), (1-2) Determining the condition for ending (restarting) the warm-up, based on a current thermal displacement amount ($D_n$) (116), Setting a permissible thermal displacement amount (PmB) used for determining whether to end (restart) the warm-up (118), (2) Selecting an operation to be performed subsequent to the end of the warm-up (120), (2-1) Settings for automatic machining (122), Settings of a measurement program used for resetting a machining starting point, and settings of the machining program for machining workpiece (124), (2-2) Settings for simply ending the warm-up (126), Settings for determining whether to alert the operator by using a buzzer or other audio-visual means (128), Selecting whether to perform the warm-up again (130)

Settings for performing the warm-up again (132),

Settings for not performing the warm-up again (134).

After the warm-up is started manually, it is determined whether a warm-up mode is ON or not. When the warm-up mode is ON, "determination on whether to end the warm-up" is performed. When, on the other hand, the warm-up mode is OFF, warm-up control is not carried out. In other words, the warm-up is manually ended accordingly.

Figure 7:
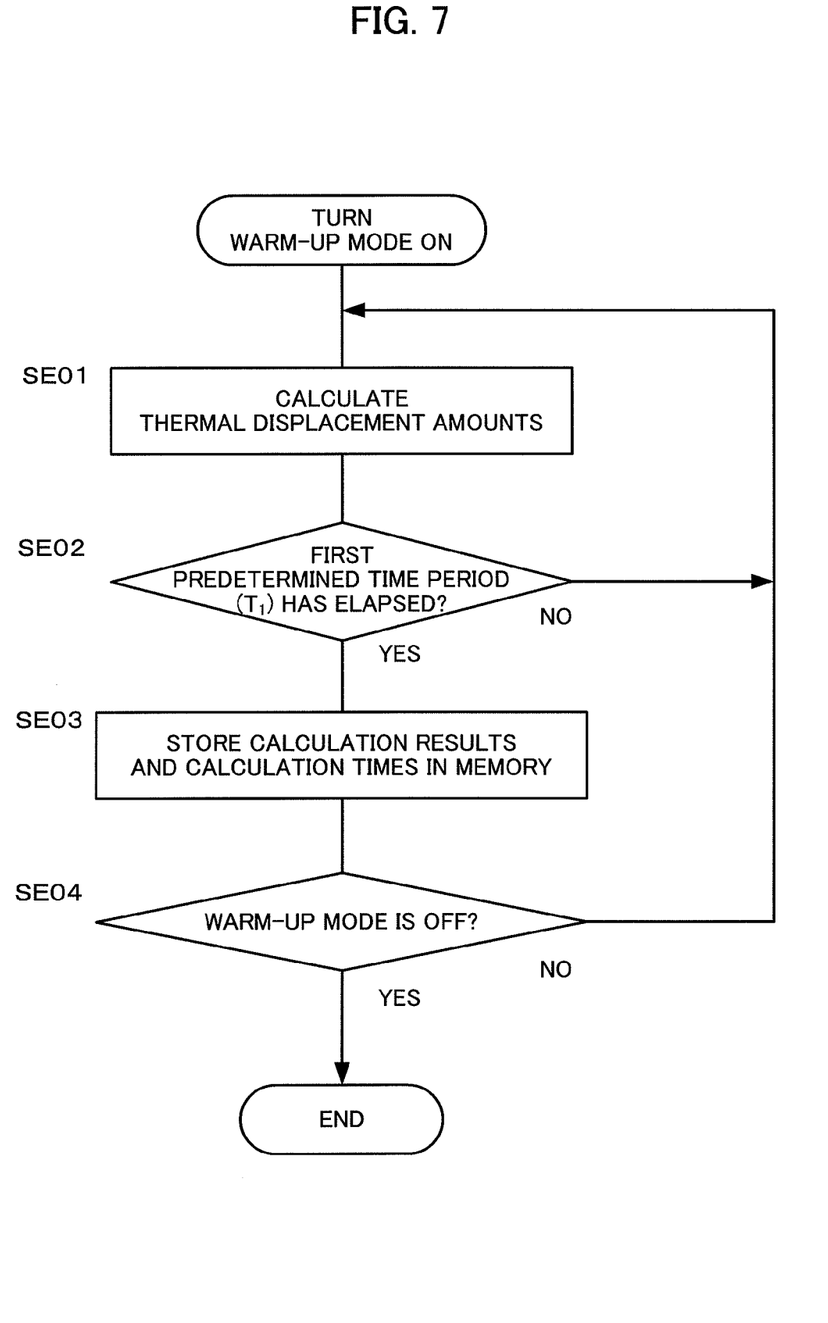

When the warm-up mode is turned ON, thermal displacement amount is calculated in the process shown in the flowchart of FIG. 7. The thermal displacement amounts are continuously calculated as long as the warm-up mode is not turned OFF. Results of the calculation and data on calculation times are saved to the memory every first predetermined time period ($T_1$). The same method as the one disclosed in, for example, Japanese Patent Application Laid-Open No. 2002-18677 is used to calculate the thermal displacement amounts.

Whether to end the warm-up may be determined as follows:

(1) As a result of setting the condition for ending the warm-up, which is determined in "setting of operating conditions," each of the thermal displacement amounts stored in the memory every first predetermined time period ($T_1$) back to a time traced back by a time period (T) is called up from the memory, the time period (T) being set in "setting of operating conditions." Then, it is determined whether or not the difference between the maximum value ($D_{max}$) and the minimum value ($D_{min}$) of the thermal displacement amounts is smaller than the permissible value (PmA) determined in "setting of operating conditions" (see FIG. 3A and FIG. 3B); or (2) It is determined whether or not the current thermal displacement amount ($D_n$) is greater than the permissible thermal displacement amount (PmB) determined in "setting of operating conditions" (see FIG. 4), depending on the condition for ending the warm-up, which is determined in "setting of operating conditions."

When "determination on whether to end the warm-up" is performed, a previous thermal displacement amount may be compared with a current thermal displacement amount every predetermined time period, and then whether the comparison result (the difference therebetween) is equal to or less than the permissible value may be determined. In this case, it can only be determined whether the thermal displacement amount is stable or not, based only on the difference between the two continuous thermal displacement amounts acquired every predetermined period. The result of such determination lacks credibility. For example, the value of the previous thermal displacement amount might be the same as the current thermal displacement amount due to the influence of false detection performed by the measuring device measuring the thermal displacement amounts. For this reason, when the thermal displacement amount is not stable as normal, it might be determined that the thermal displacement is stable.

In the embodiment where only the current thermal displacement amount is used as the basis for the determination as shown in FIG. 4, the determination is made depending only on one thermal displacement amount in the chronological order of thermal displacement amounts. This embodiment is more unreliable than making the determination based on the difference between two thermal displacement amounts. However, because the permissible value that is used as the basis for the determination is not the difference between two thermal displacement amounts but the absolute value of a thermal displacement amount, the operator's know-how can be maximized.

The determination embodiment shown in FIGS. 3A and 3B designates a certain time range in the chronological order of thermal displacement amounts, calculates the maximum value and the minimum value from all of the thermal displacement amounts recorded in the range, and determines whether the difference between the maximum value and the minimum value is equal to or less than the permissible value. Thus, by designating a large time range to acquire thermal displacement amount data, a lot of thermal displacement amounts can be used as the basis for the determination. Consequently, determination accuracy of this embodiment becomes higher than those of the abovementioned two embodiments. The embodiment shown in FIGS. 3A and 3B sets the time period (T), which is set in "setting of operating conditions," to be the same value as the first predetermined time period ($T_1$) in which the thermal displacement amounts are stored (in step SA06 shown in FIG. 3A, which is described hereinafter, the number of times to call up the thermal displacement amounts K ($=T/T_1$) is 1), thereby achieving the same results as those of the embodiment where the previous thermal displacement amount is compared with the current thermal displacement amount every predetermined time period.

When it is determined in "determination on whether to end the warm-up" that the warm-up is continued, "determination on whether to end the warm-up" is repeatedly continued every second predetermined time period ($T_2$). When it is determined in "determination on whether to end the warm-up" that the warm-up is ended, the warm-up is ended, and an operation following the warm-up is carried out.

<2> From the End of the Warm-Up to a Restart of the Warm-Up (FIGS. 5A to 50, FIG. 6)

Embodiment 1 of a process from the end of the warm-up to a restart of the warm-up (FIGS. 5A to 5C) and Embodiment 2 of the process (FIG. 6) are described hereinafter in detail.

The operator is notified of the end of the warm-up by the audio-visual means such as a buzzer by selecting an operation to be performed subsequent to the end of the warm-up, the selection being performed in "setting of operating conditions." Depending on the selected operation to be performed subsequent to the end of the warm-up, the warm-up mode can automatically turned OFF, and the machining starting point can be reset and the machining itself can be started, by using the measurement program and the machining program that are set in "setting of operating conditions." When selecting to notify the operator by using the audio-visual means such as a buzzer, determination on whether to perform the warm-up again is carried out.

When selecting to perform the warm-up again based on the conditions set in "setting of operating conditions" in order to select whether to perform the warm-up again, whether to perform the warm-up again or not is determined by setting conditions for restarting the warm-up, the conditions being set in "setting of operating conditions."

Two embodiments for determining whether to restart the warm-up or not are described hereinafter.

Figure 5A:
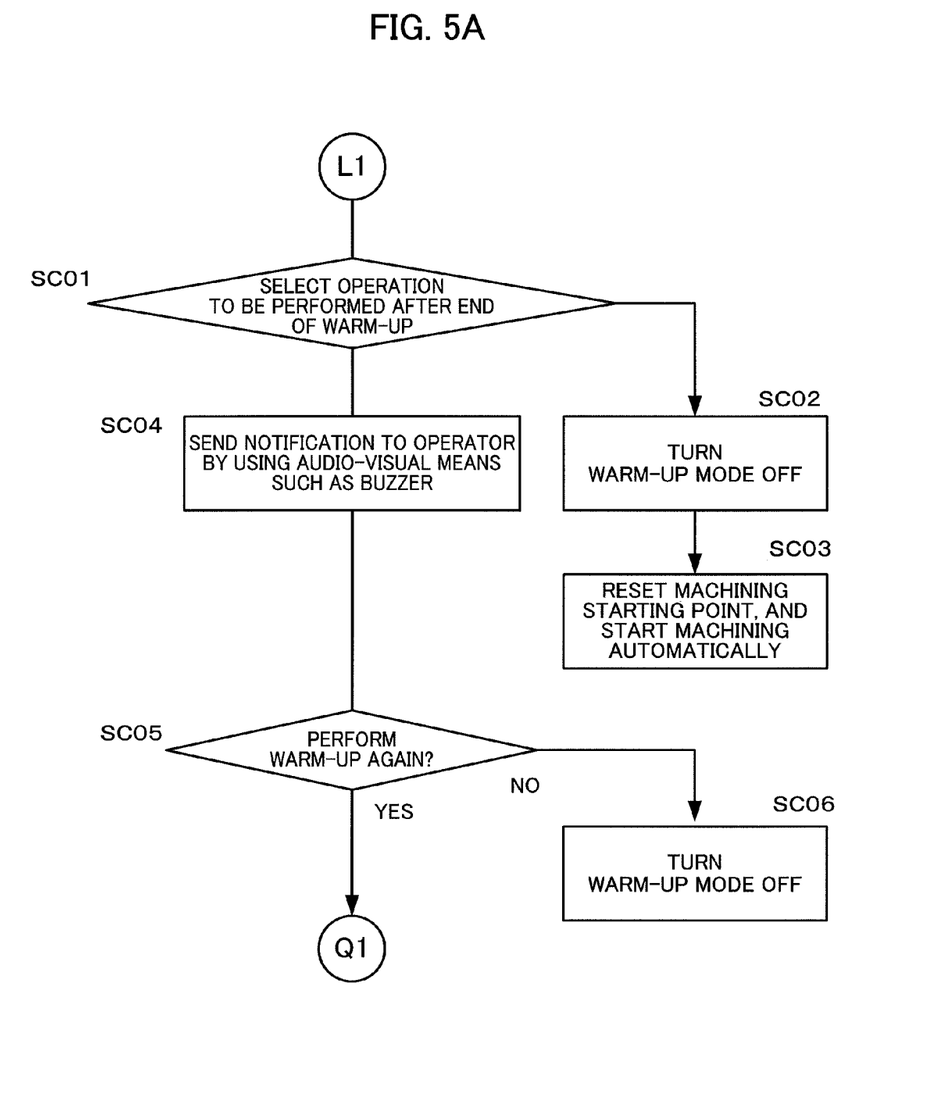
FIGS. 5A to 5C are flowcharts of Embodiment 1 of a process from the end of the warm-up to a restart of the warm-up.
Figure 5B:
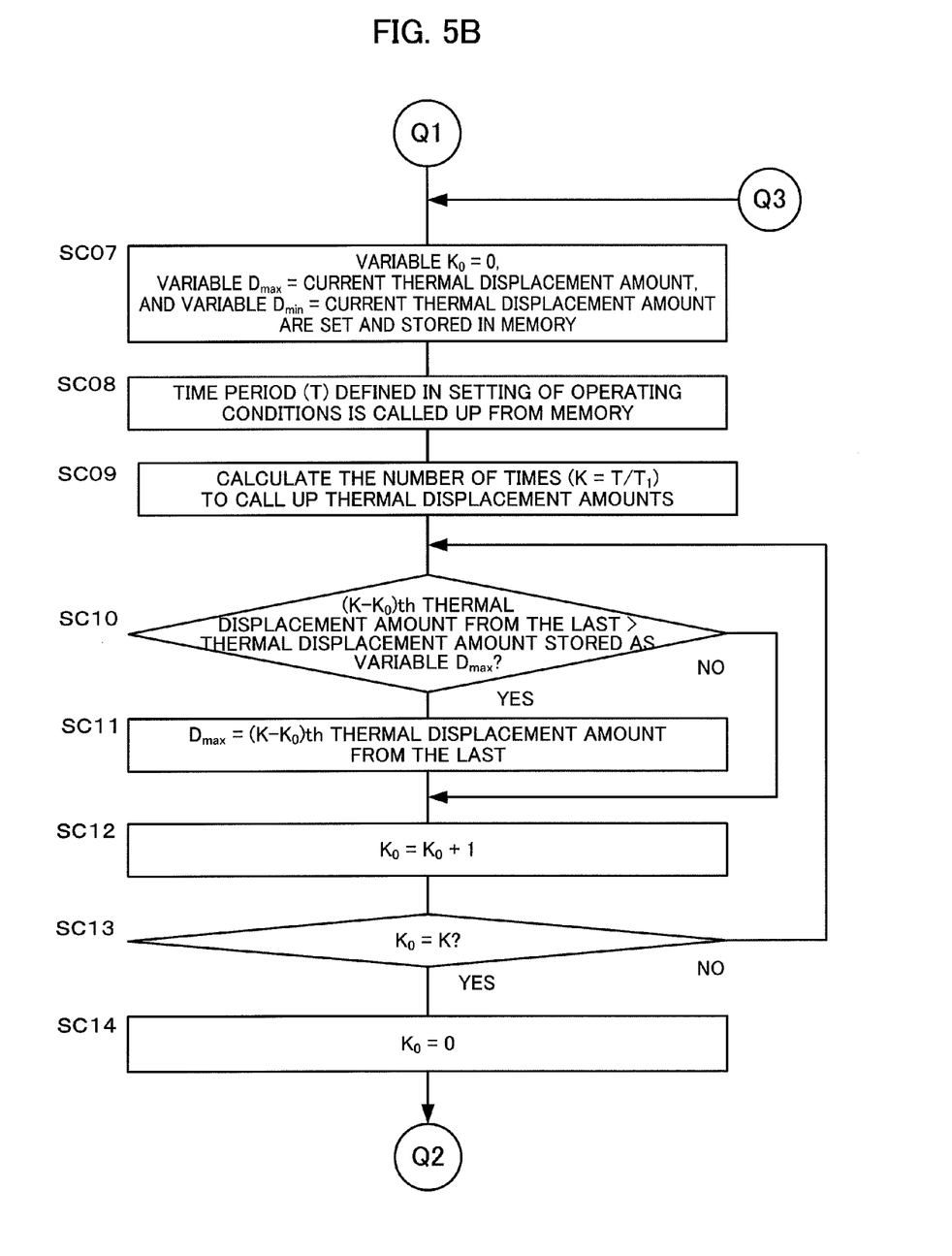
Figure 5C:
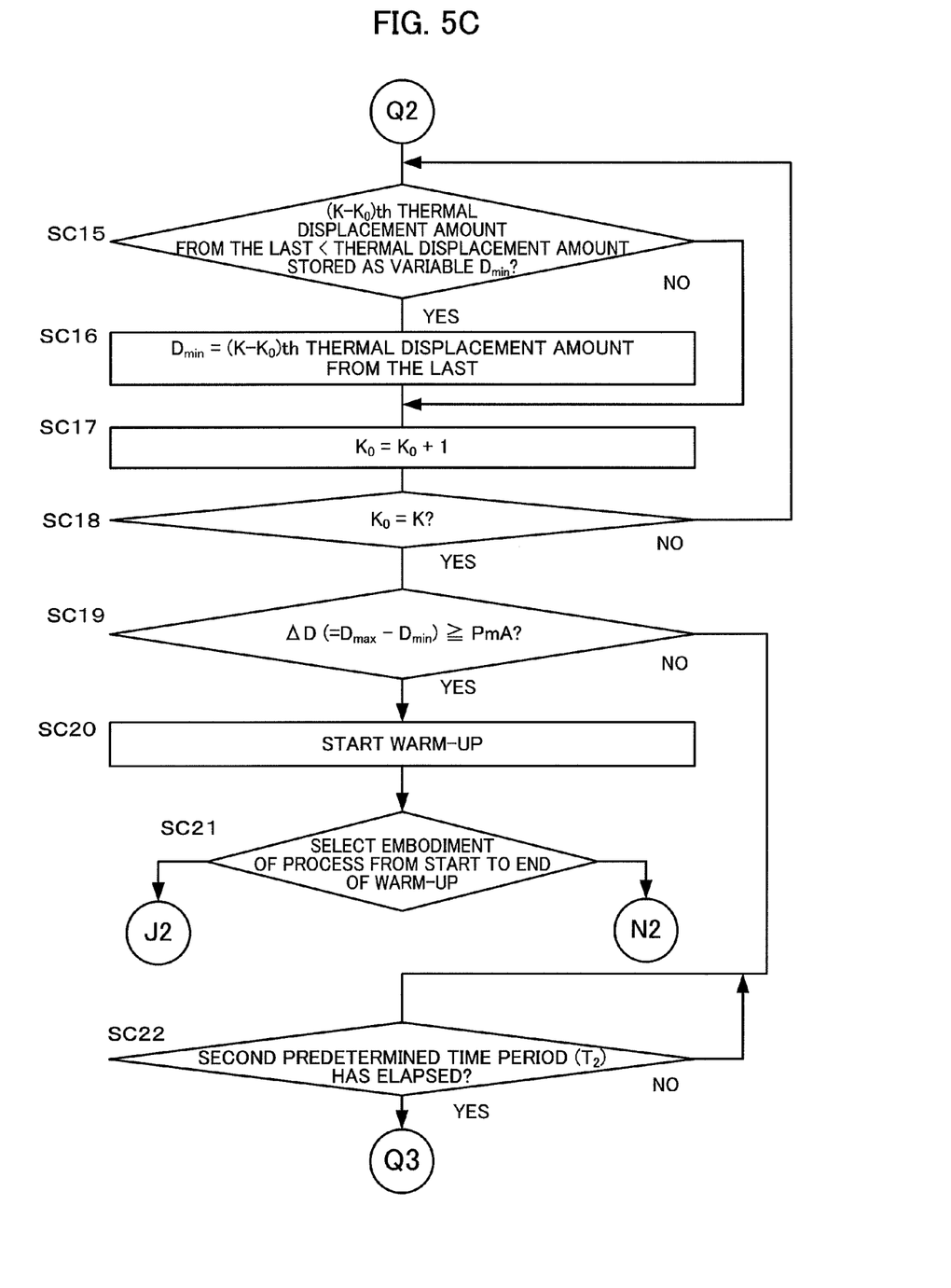

(1) Based on the warm-up restarting conditions that are set in "setting of operating conditions," each of the thermal displacement amounts that is stored every first predetermined time period ($T_1$) back to a time traced back by the time period (T) is called up from the memory, the time period (T) being set in "setting of operating conditions." Then, it is determined whether to restart the warm-up, depending on whether or not the difference between the maximum value ($D_{max}$) and the minimum value ($D_{rain}$) of the thermal displacement amounts is greater than the permissible value (PmA) determined in "setting of operating conditions" (see FIGS. 5A to 5C).

Figure 6:
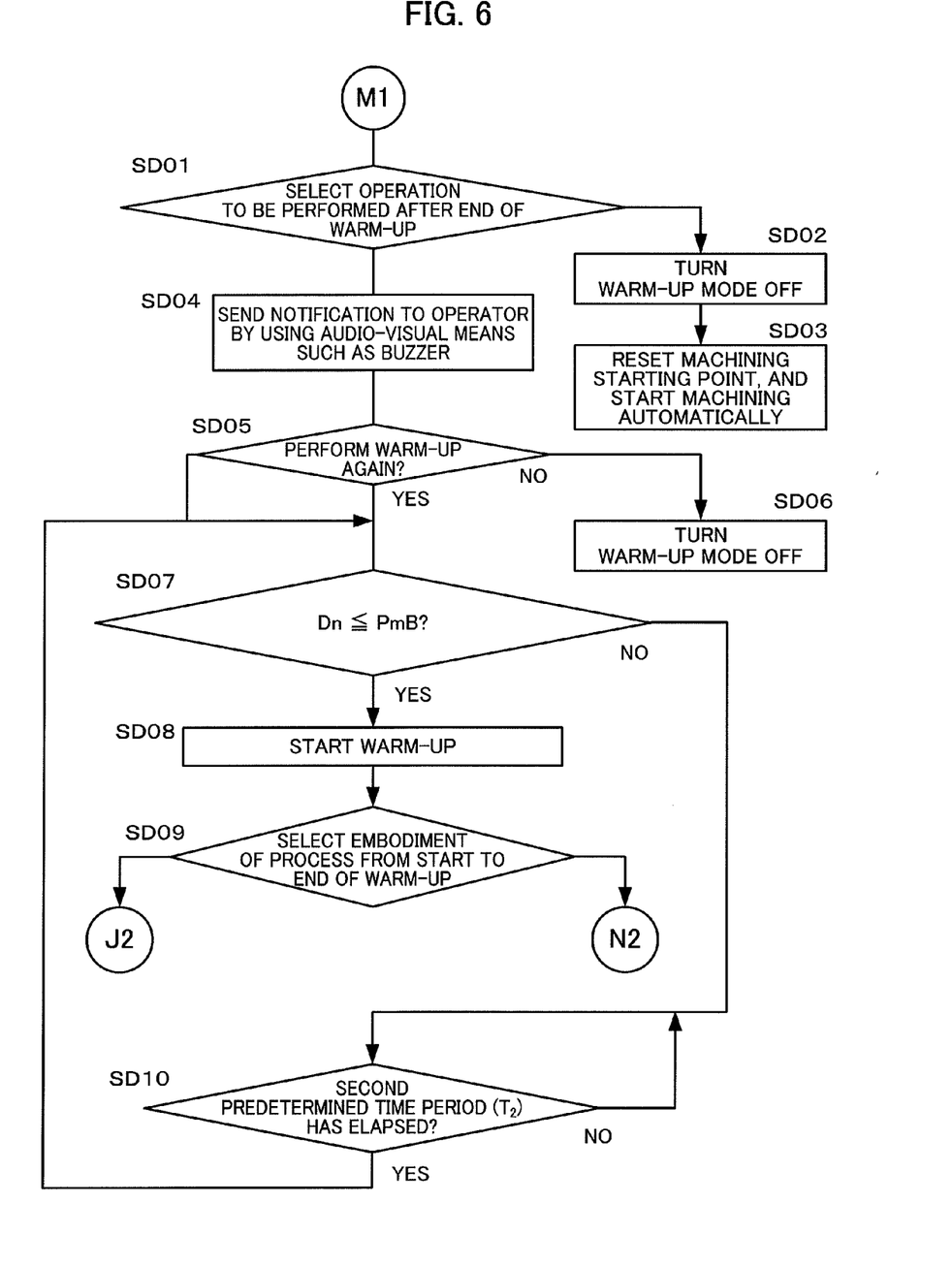
FIG. 6 is a flowchart of Embodiment 2 of the process from the end of the warm-up to the restart of the warm-up.

(2) Depending on the warm-up restarting conditions that are set in "setting of operating conditions," it may be determined whether to restart the warm-up based on whether or not the current thermal displacement amount ($D_n$) is smaller than the permissible thermal displacement amount (PmB) set in "setting of operating conditions" (see FIG. 6).

The embodiment ((1) described above) shown in FIGS. 5A to 5C for determining whether to restart the warm-up can achieve determination accuracy higher than that in the embodiment ((2) described above) shown in FIG. 6 and that in the embodiment where the previous thermal displacement amount is compared with the current thermal displacement amount every predetermined time period.

The embodiment shown in FIGS. 5A to 5C sets the time period (T), which is set in "setting of operating conditions," to be the same value as the first predetermined time period ($T_1$) in which the thermal displacement amount is stored, thereby achieving the same results as those of the embodiment where the previous thermal displacement amount is compared with the current thermal displacement amount every predetermined time period. When it is determined, in determination on whether to restart the warm-up, that warm-up is not restarted, determination on whether to restart the warm-up is repeatedly continued every second predetermined time period ($T_2$). When it is determined, in determination on whether to restart the warm-up, that the warm-up is restarted, the warm-up is started automatically, and "determination on whether to end the warm-up" described above is carried out.

Steps of the flowchart shown in FIGS. 3A to 7 are now described. In order to control the warm-up, whether to perform Embodiment 1 (FIGS. 3A and 3B) and Embodiment 2 (FIG. 4) of <1> describing the flow between the start of a warm-up and the end of the warm-up or Embodiment 1 (FIGS. 5A to 5C) and Embodiment 2 (FIG. 6) of <2> describing the flow between the end of the warm-up and a restart of the warm-up, is set previously or set through step SA01 (FIG. 3A) and step SB01 (FIG. 4).

Embodiment 1 of the process from the start of a warm-up to the end of the warm-up is described with reference to the flowcharts shown in FIGS. 3A and 3B. Each of the steps of these flowcharts is described hereinafter.

[Step SA01] Warm-up operating conditions are set. In other words, the operating conditions stored in the memory are read in a manner illustrated in FIG. 8.

[Step SA02] A warm-up is started.

[Step SA03] It is determined whether the warm-up mode is ON or not. When the warm-up mode is ON, the process proceeds to step SA04. When the warm-up mode is not ON, this step (determination) is continued until the warm-up mode is turned ON. When the warm-up mode is OFF, the warm-up can be manually ended at appropriate time without controlling the warm-up.

[Step SA04] Variable $K_0=0$, variable $D_{max}$=current thermal displacement amount, and variable $D_{min}$=current thermal displacement amount, are set and stored in the memory.

[Step SA05] The time period (T) that is set in "setting of operating conditions" (FIG. 8) is called up from the memory.

[Step SA06] The number of times to call up the thermal displacement amounts ($K=T/T_1$) is calculated. In this case, the value $T_1$ is "the first predetermined time period" used in the process shown in the flowchart of FIG. 7.

[Step SA07] It is determined whether the $(K-K0)^{th}$ thermal displacement amount from the last is greater than the thermal displacement amount stored as the variable $D_{max}$. When the thermal displacement amount is greater than the stored thermal displacement amount (YES), the process proceeds to step SA08. When the thermal displacement amount is not greater than the stored thermal displacement amount (NO), the process proceeds to step SA09.

[Step SA08] The value of the variable $D_{max}$ is set as the $(K-K0)^{th}$ thermal displacement amount from the last. In other words, $K_0=K_0+1$ is set.

[Step SA10] It is determined whether the variable $K_0$ is equal to K. When the variable $K_0$ is equal to K (YES), the process proceeds to step SA11. When the variable $K_0$ is not equal to K (NO), the process returns to step SA07.

[Step SA11] Variable $K_0=0$ is set.

[Step SA12] It is determined whether the $(K-K0)^{th}$ thermal displacement amount from the last is smaller than the thermal displacement amount stored as the variable $D_{min}$. When the thermal displacement amount is smaller than the stored thermal displacement amount (YES), the process proceeds to step SA13. When the thermal displacement amount is not smaller than the stored thermal displacement amount (NO), the process proceeds to step SA14.

[Step SA13] The value of the variable $D_{min}$ is set as the $(K-K0)^{th}$ thermal displacement amount from the last.

[Step SA14] The variable $K_0$ is updated. In other words, $K_0=K_0+1$ is set.

[Step SA15] It is determined whether the variable $K_0$ is equal to K. When the variable $K_0$ is equal to K (YES), the process proceeds to step SA16. When the variable $K_0$ is not equal to K (NO), the process returns to step SA12.

[Step SA16] It is determined whether a difference $\Delta D$ between the maximum value $D_{max}$ and the minimum value $D_{min}$ of the thermal displacement amounts is equal to or less than the permissible value (PmA) defined in "setting of operating conditions." When the difference is equal to or less than the permissible value ($\Delta D \leq PmA$, YES), the process proceeds to step SA17. When the difference is greater than the permissible value ($\Delta D > PmA$, NO), step SA19 is performed.

[Step SA17] The warm-up is ended, and then the process proceeds to step SA18.

[Step SA18] Whether to set the embodiment of the process from the restart of the warm-up to the end of the warm-up as Embodiment 1 (L1) or Embodiment 2 (M2), is determined according to "setting of operating conditions" of the warm-up. Note that the operating conditions for the warm-up that are used as the basis for determining whether to set the embodiment as Embodiment 1 (L1) or Embodiment 2 (M2) are set previously or set using step SA01.

[Step SA19] It is determined whether the second predetermined time period ($T_2$) has elapsed or not. When the second predetermined time period has elapsed (YES), the process returns to step SA04. When the second predetermined time period has not elapsed (NO), the lapse of the second predetermined time period ($T_2$) is waited.

Embodiment 2 of the process from the start of the warm-up to the end of the warm-up is now described with reference to the flowchart of FIG. 4. Each of the steps of the flowchart is described hereinafter.

[Step SB01] Warm-up operating conditions are set. In other words, the operating conditions stored in the memory are read in the manner illustrated in FIG. 8.

[Step SB02] A warm-up is started.

[Step SB03] It is determined whether the warm-up mode is ON or not. When the warm-up mode is ON, the process proceeds to step SB04. When the warm-up mode is not ON, this step (determination) is continued until the warm-up mode is turned ON. When the warm-up mode is OFF, the warm-up can be manually ended at appropriate time without controlling the warm-up.

[Step SB04] It is determined whether the current thermal displacement amount ($D_n$) is equal to or greater than the permissible thermal displacement amount (PmB) defined in "setting of operating conditions." When the current thermal displacement amount is equal to or greater than the permissible thermal displacement amount ($D_n \geq PmB$, YES), the process proceeds to step SB05. When the current thermal displacement amount is less than the permissible thermal displacement amount ($D_n < PmB$, NO), the process proceeds to step SB07.

[Step SB05] The warm-up is ended, and then step SB06 is carried out.

[Step SB06] Whether to set the embodiment of the process from the restart of the warm-up to the end of the warm-up as Embodiment 1 (L1) or Embodiment 2 (M2), is determined according to "setting of operating conditions" of the warm-up. Note that the operating conditions for the warm-up that are used as the basis for determining whether to set the embodiment as Embodiment 1 (L1) or Embodiment 2 (M2) are set previously or set using step SB01.

[Step SB07] It is determined whether the second predetermined time period ($T_2$) has elapsed or not. When the second predetermined time period has elapsed (YES), the process returns to step SB04. When the second predetermined time period has not elapsed (NO), the lapse of the second predetermined time period ($T_2$) is waited.

Embodiment 1 of the process from the end of the warm-up to a restart of the warm-up is now described with reference to the flowcharts of FIGS. 5A to 5C. Each of the steps of these flowcharts is described hereinafter.

[Step SC01] The operation to be performed subsequent to the end of the warm-up is selected. In other words, in step SA01 or step SB01, the operating conditions stored in the memory are read in the manner illustrated in FIG. 8, and the operation to be performed subsequent to the end of the warm-up is selected in accordance with the read operating conditions. When the content described in the reference numeral 126 of FIG. 8 (simply ending the warm-up) is set, the process proceeds to step SC04. When the content described in the reference numeral 122 (automatically performing the machining) is set, the process proceeds to step SC02.

[Step SC02] The warm-up mode is turned OFF.

[Step SC03] The machining starting point is reset, and the machining is automatically started.

[Step SC04] Based on the set operating conditions, the operator is alerted by the audio-visual means such as a buzzer, and then the process proceeds to step SC05. Step SC05 is performed even when the alert is not given.

[Step SC05] It is determined whether the warm-up is performed again or not. When the warm-up is performed again (YES), the process proceeds to step SC07. When the warm-up is not performed again (NO), the process proceeds to step SC06.

[Step SC06] The warm-up mode is turned OFF.

[Step SC07] Variable $K_0$=0, variable $D_{max}$=current thermal displacement amount, and variable $D_{min}$=current thermal displacement amount, are set and stored in the memory.

[Step SC08] The time period (T) that is defined in "setting of operating conditions" is called up from the memory.

[Step SC09] The number of times to call up the thermal displacement amounts ($K=T/T_1$) is calculated. In this case, the value $T_1$ is "the first predetermined time period" used in the process shown in the flowchart of FIG. 7.

[Step SC10] It is determined whether the $(K-K0)^{th}$ thermal displacement amount from the last is greater than the thermal displacement amount stored as the variable $D_{max}$. When the thermal displacement amount is greater than the stored thermal displacement amount (YES), the process proceeds to step SC11. When the thermal displacement amount is not greater than the stored thermal displacement amount (NO), the process proceeds to step SC12.

[Step SC11] The value of the variable $D_{max}$ is set as the $(K-K0)^{th}$ thermal displacement amount from the last.

[Step SC12] The variable $K_0$ is updated. In other words, $K_0=K_0+1$ is set.

[Step SC13] It is determined whether the variable $K_0$ is equal to K. When the variable $K_0$ is equal to K (YES), the process proceeds to step SC14. When the variable $K_0$ is not equal to K (NO), the process returns to step SC10.

[Step SC14] Variable $K_0$=0 is set.

[Step SC15] It is determined whether the $(K-K0)^{th}$ thermal displacement amount from the last is smaller than the thermal displacement amount stored as the variable $D_{min}$. When the thermal displacement amount is smaller than the stored thermal displacement amount (YES), the process proceeds to step SC16. When the thermal displacement amount is not smaller than the stored thermal displacement amount (NO), the process proceeds to step SC17.

[Step SC16] The value of the variable $D_{min}$ is set as the $(K-K0)^{th}$ thermal displacement amount from the last.

[Step SC17] The variable $K_0$ is updated. In other words, $K_0=K_0+1$ is set.

[Step SC18] It is determined whether the variable $K_0$ is equal to K. When the variable $K_0$ is equal to K (YES), the process proceeds to step SC19. When the variable $K_0$ is not equal to K (NO), the process proceeds to step SC15.

[Step SC19] It is determined whether the difference ΔD between the maximum value $D_{max}$ and the minimum value $D_{min}$ of the thermal displacement amounts is equal to or greater than the permissible value (PmA) defined in "setting of operating conditions." When the difference is equal to or greater than the permissible value (ΔD≥PmA, YES), the process proceeds to step SC20. When the difference is less than the permissible value (ΔD<PmA, NO), the process proceeds to step SC22.

[Step SC20] The warm-up is started, and then the process proceeds to step SC21.

[Step SC21] Whether to set the embodiment of the process from the start of the warm-up to the end of the warm-up as Embodiment 1 (J2) or Embodiment 2 (N2), is determined according to "setting of operating conditions" of the warm-up. Note that the operating conditions for the warm-up that are used as the basis for determining whether to set the embodiment as Embodiment 1 (J2) or Embodiment 2 (N2) are set previously or set using step SA01 shown in the flowchart of FIG. 3A or using step SB01 shown in the flowchart of FIG. 4.

[Step SC22] It is determined whether the second predetermined time period ($T_2$) has elapsed or not. When the second predetermined time period has elapsed (YES), the process proceeds to step SC07. When the second predetermined time period has not elapsed (NO), the lapse of the second predetermined time period ($T_2$) is waited.

Embodiment 2 of the process from the end of the warm-up to a restart of the warm-up is now described with reference to the flowchart of FIG. 6. Each of the steps of the flowchart is described hereinafter.

[Step SD01] The operation to be performed subsequent to the end of the warm-up is selected. In other words, in step SA01 or step SB01, the operating conditions stored in the memory are read in the manner illustrated in FIG. 8, and the operation to be performed subsequent to the end of the warm-up is selected in accordance with the read operating conditions. When the content described in the reference numeral 126 of FIG. 8 (simply ending the warm-up) is set, the process proceeds to step SD04. When the content described in the reference numeral 122 (automatically performing the machining) is set, step SD02 is performed.

[Step SD02] The warm-up mode is turned OFF.

[Step SD03] The machining starting point is reset, and the machining is automatically started.

[Step SD04] Based on the set operating conditions, the operator is alerted by the audio-visual means such as a buzzer, and then the process proceeds to step SD05. Step SD05 is performed even when the alert is not given.

[Step SD05] It is determined whether the warm-up is performed again or not. When the warm-up is performed again (YES), the process proceeds to step SD07. When the warm-up is not performed again (NO), the process proceeds to step SD06.

[Step SD06] The warm-up mode is turned OFF.

[Step SD07] It is determined whether the current thermal displacement amount ($D_n$) is equal to or less than the permissible thermal displacement amount (PmB) defined in "setting of operating conditions." When the current thermal displacement amount is equal to or less than the permissible thermal displacement amount ($D_n$≤PmB, YES), the process proceeds to step SD08. When the current thermal displacement amount is greater than the permissible thermal displacement amount ($D_n$>PmB, NO), the process proceeds to step SD10.

[Step SD08] The warm-up is started, and then the process proceeds to step SD09.

[Step SD09] Whether to set the embodiment of the process from the start of the warm-up to the end of the warm-up as Embodiment 1 (J2) or Embodiment 2 (N2), is determined according to "setting of operating conditions" of the warm-up. Note that the operating conditions for the warm-up that are used as the basis for determining whether to set the embodiment as Embodiment 1 (J2) or Embodiment 2 (N2)

are set previously or set using step SA01 shown in the flowchart of FIG. 3A or using step SB01 shown in the flowchart of FIG. 4.

[Step SD10] It is determined whether the second predetermined time period ($T_2$) has elapsed or not. When the second predetermined time period has elapsed (YES), the process proceeds to step SD07. When the second predetermined time period has not elapsed (NO), the lapse of the second predetermined time period is waited.

FIG. 7 is a flowchart relating to calculation of the thermal displacement amounts that is performed when the warm-up mode is ON. Each of the steps of the flowchart is described hereinafter.

[Step SE01] The thermal displacement amounts are calculated.

[Step SE02] It is determined whether the first predetermined time period ($T_1$) has elapsed or not. When the first predetermined time period has elapsed (YES), the process proceeds to step SE03. When the first predetermined period has not elapsed (NO), the process proceeds to step SE01.

[Step SE03] Results of the calculation and calculation times are stored in the memory.

[Step SE04] It is determined whether the warm-up mode is OFF or not. When the warm-up mode is OFF (YES), the process is ended. When the warm-up modes is not OFF (NO), the process returns to step SE01.

What is claimed is:

1. A warm-up control device for a machine tool, which performs, before machining a workpiece, a warm-up by driving a main shaft rotary drive part for rotating a main shaft of the machine tool and axes drive parts for relatively driving a workpiece and a tool, the warm-up control device comprising:
   a thermal displacement amount calculation part that obtains a thermal displacement amount that results from heat generated or released upon starting or ending the warm-up of the machine tool and changes with time;
   a thermal displacement amount storage unit that stores the thermal displacement amount that is calculated every predetermined time period by the thermal displacement amount calculation part and a time at which the thermal displacement amount is calculated;
   a warm-up end determination part that determines whether to end the warm-up based on the thermal displacement amount;
   a warm-up ending part that ends the warm-up when the warm-up end determination part determines to end the warm-up;
   a warm-up restart determination part that calls up, from the thermal displacement amount storage unit, the thermal displacement amount that is calculated every predetermined time period back to a time traced back by a previously set time period, after the end of the warm-up, calculates a difference between a maximum value and minimum value out of the called thermal displacement amounts, and compares the difference between the maximum value and the minimum value of the displacement amounts with a previously set permissible value to determine whether or not to restart the warm-up; and
   a warm-up restarting part that restarts the warm-up when the warm-up restart determination part determines to restart the warm-up.

2. The warm-up control device for a machine tool according to claim 1, wherein the warm-up restart determination part restarts the warm-up when the difference between the maximum value and the minimum value of the displacement amounts is greater than a previously set permissible value.

3. The warm-up control device for a machine tool according to claim 2, further comprising a warm-up end reporting part that sends a notification of the end of the warm-up when the warm-up is ended by the warm-up ending part.

4. The warm-up control device for a machine tool according to claim 1, wherein the warm-up end determination part ends the warm-up when a current thermal displacement amount calculated by the thermal displacement amount calculation part is greater than a previously set permissible thermal displacement amount.

5. The warm-up control device for a machine tool according to claim 1, further comprising a warm-up end reporting part that sends a notification of the end of the warm-up when the warm-up is ended by the warm-up ending part.

6. A warm-up control device for a machine tool, which performs, before machining a workpiece, a warm-up by driving a main shaft rotary drive part for rotating a main shaft of the machine tool and axes drive parts for relatively driving a workpiece and a tool, the warm-up control device comprising:
   a thermal displacement amount calculation part that obtains a thermal displacement amount that results from heat generated or released upon starting or ending the warm-up of the machine tool and changes with time;
   a thermal displacement amount storage unit that stores the thermal displacement amount that is calculated every predetermined time period by the thermal displacement amount calculation part and a time at which the thermal displacement amount is calculated;
   a warm-up end determination part that calls up, from the thermal displacement amount storage unit, the thermal displacement amount that is calculated every predetermined time period back to a time traced back by a previously set time period, after the end of the warm-up, calculates a difference between a maximum value and minimum value out of the called thermal displacement amounts, and compares the difference between the maximum value and the minimum value of the displacement amounts with a previously set permissible value to determine whether or not to end the warm-up;
   a warm-up ending part that ends the warm-up when the warm-up end determination part determines to end the warm-up;
   a warm-up restart determination part that determines whether to restart the warm-up after the end of the warm-up, based on the thermal displacement amount; and
   a warm-up restarting part that restarts the warm-up when the warm-up restart determination part determines to restart the warm-up.

7. The warm-up control device for a machine tool according to claim 6, wherein the warm-up end determination part ends the warm-up when the difference is smaller than a previously set permissible value.

8. The warm-up control device for a machine tool according to claim 7, further comprising a warm-up end reporting part that sends a notification of the end of the warm-up when the warm-up is ended by the warm-up ending part.

9. The warm-up control device for a machine tool according to claim 6, further comprising a warm-up end reporting part that sends a notification of the end of the warm-up when the warm-up is ended by the warm-up ending part.

* * * * *